United States Patent [19]

Hattori et al.

[11] Patent Number: 5,012,259

[45] Date of Patent: Apr. 30, 1991

[54] COLOR RECORDER WITH GAS LASER BEAM SCANNING

[75] Inventors: Tsuyoshi Hattori; Masanao Tanaka; Syoji Matsuzaka, all of Hino, Japan

[73] Assignee: Konica Corporation, Tokyo, Japan

[21] Appl. No.: 300,339

[22] Filed: Jan. 23, 1989

[30] Foreign Application Priority Data

Jan. 28, 1988 [JP] Japan .................................. 63-17605

[51] Int. Cl.$^5$ .......................... H04N 1/21; G03C 7/46
[52] U.S. Cl. ..................................... 346/108; 430/383
[58] Field of Search ................ 346/108, 107 R, 76 L, 346/1.1; 430/363, 383, 945, 952

[56] References Cited

U.S. PATENT DOCUMENTS 4,529,684  7/1985  Sasagawa et al. ................... 346/1.1
4,770,978  9/1988  Matsuzaka et al. .................. 430/363

FOREIGN PATENT DOCUMENTS 55-4071   1/1980  Japan .
56-14963  4/1981  Japan .
62-75622  4/1987  Japan .
62-83727  4/1987  Japan .
62-94821  5/1987  Japan .
62-94823  5/1987  Japan .

*Primary Examiner*—Mark J. Reinhart
*Attorney, Agent, or Firm*—Frishauf, Holtz, Goodman & Woodward

[57] ABSTRACT

Disclosed is a color image forming system comprising an optical scanning exposure apparatus by which scanning is made on a light-sensitive silver halide color photographic material, wherein a He-Cd gas laser is used as a blue light source and a He-Ne gas laser is used as a green light source, respectively; or wherein a He-Ne gas laser is used as a green light source and at least one layer of the light-sensitive silver halide color photographic material contains silver chloride in an amount of 90 to 100 mole %.

The color image forming system of this invention has a scanning exposure apparatus using inexpensive, stable, compact and long-life light sources and can obtain a color image of high image quality with good color reproducibility. Also, the system can be made inexpensive and compact as a whole.

13 Claims, 10 Drawing Sheets

Digital color image signal

Digital color image signal

Digital color image signal

Digital color image signal

COLOR RECORDER WITH GAS LASER BEAM SCANNING

BACKGROUND OF THE INVENTION

This invention relates to a color image forming system, and, particularly to a color image forming system comprising a scanning exposure unit for obtaining a color image by scanning a beam of light on a light-sensitive silver halide photographic material (hereinafter, sometimes referred to a light-sensitive material).

As a scanning type color image forming apparatuses, those using the thermal transfer system and the ink-jet system have been known in the prior art. However, these apparatuses were insufficient in resolution, reproduction of tone (delicate tone) and reproduction of texture, and thus high quality images could not be obtained.

For obtaining high quality image which satisfy the above-mentioned requirements, most preferred is a method in which exposure is carried out by scanning exposure apparatus on a silver halide light-sensitive material.

A principle of obtaining a color image by means of the so-called optical scanning exposure unit in which a beam of light is scanned on a light-sensitive material will be described below.

Color image data separated into the three colors B, G and R are converted to light intensities of correspondingly different wavelength bands, and scanning is made on a light-sensitive color photographic material by use of the light of these. The scanning herein mentioned, which may be made by moving the light or by moving the light-sensitive material, means the relative movement of light to the light-sensitive material. Used as the light-sensitive material are those having spectral sensitivity distribution corresponding to the intensity distribution of the three kinds of light to be used. The light-sensitive material receives the light signals having been modulated into intensities with the three kinds of spectral sensitivities on the basis of the color image data of the respectively corresponding B, G and R, and is color-formed in a suitable manner depending on the light signals, whereupon a color image can be obtained.

Known as three kinds of light sources are those using the three colors B, G and R. Known as the light sources are combination of white light sources such as glow lamps, xenon lamps, mercury lamps and tungsten lamps with filters; light-emitting diodes, gas lasers, solid lasers, semiconductor lasers and so forth. In general, coherent lasers are often used as the light sources in view of the high luminance, focusing performance, monochromatic sensitivity, etc. Specifically, the blue light source includes a He-Cd gas laser (441.6 nm) and an Ar+ gas laser (488.0 nm); the green light source, an Ar+ gas laser (514.5 nm), a He-Ne gas laser (543.5 nm); and the red light source, a He-Ne gas laser (632.8 nm). However, in instances where conventional Ar+ gas lasers are used as a blue light source and a green light source, respectively, the peak wavelength of the light sources thereof are adjacent each other and are not consistent with the peak of the spectral sensitivity of the conventional light-sensitive material, and therefore, color turbidity in a blue-sensitive layer and a green-sensitive layer are caused, resulting in inferior image quality. For this reason, if the green-sensitive source is replaced with a He-Ne gas laser and the blue light source employs the Ar+ gas laser as it is, the color turbidity in the blue-sensitive layer of the light-sensitive material cannot be solved, although the color turbidity in the green-sensitive layer can be solved. On the other hand, in instances where the blue light source is replaced with a He-Cd gas laser and the green light source employs Ar+ gas laser as it is, the color turbidity in the green-sensitive layer cannot be solved, although the color turbidity in the blue-sensitive layer can be solved.

Further, the above Ar+ gas laser have problems such as unstable, expensive, short in life and large in scale of the unit.

SUMMARY OF THE INVENTION

An object of this invention is to provide a color image forming system comprising a scanning exposure unit using light sources which are inexpensive, stable, compact and long-life and by which good color reproducibility and color images of high image quality can be obtained at the same time.

The above object can be accomplished by a color image forming system comprising an optical scanning exposure apparatus by which scanning is made on a light-sensitive silver halide photographic material, wherein a He-Cd gas laser is used as a blue light source and a He-Ne gas laser is used as a green light source, respectively.

In this invention, a He-Cd gas laser (441.6 nm) is used as a blue light source and a He-Ne gas laser (543.5 nm) is used as a geen light source, respectively. These light sources are inexpensive, stable, compact and long-life. Further, since the peak wavelengths of these light sources are distant each other, and consistent with the peak of the spectral sensitivity of the conventional light-sensitive material, and thus color images of high image quality with good color reproducibility without causing color turbidity, resulting in accomplishment of the object of this invention.

The above object can also be accomplished by a color image forming system comprising an optical scanning exposure apparatus by which scanning is made on a light-sensitive silver halide color photographic material, wherein a He-Ne gas laser is used as a green light source and at least one layer of the light-sensitive silver halide color photographic material contains silver chloride in an amount of 90 to 100 mole %.

DESCRIPTION OF THE PREFERRED EMBODIMENTS

Hereinafter, the constitution of this invention will be described in detail by referring FIG. 1.

Figure 1:
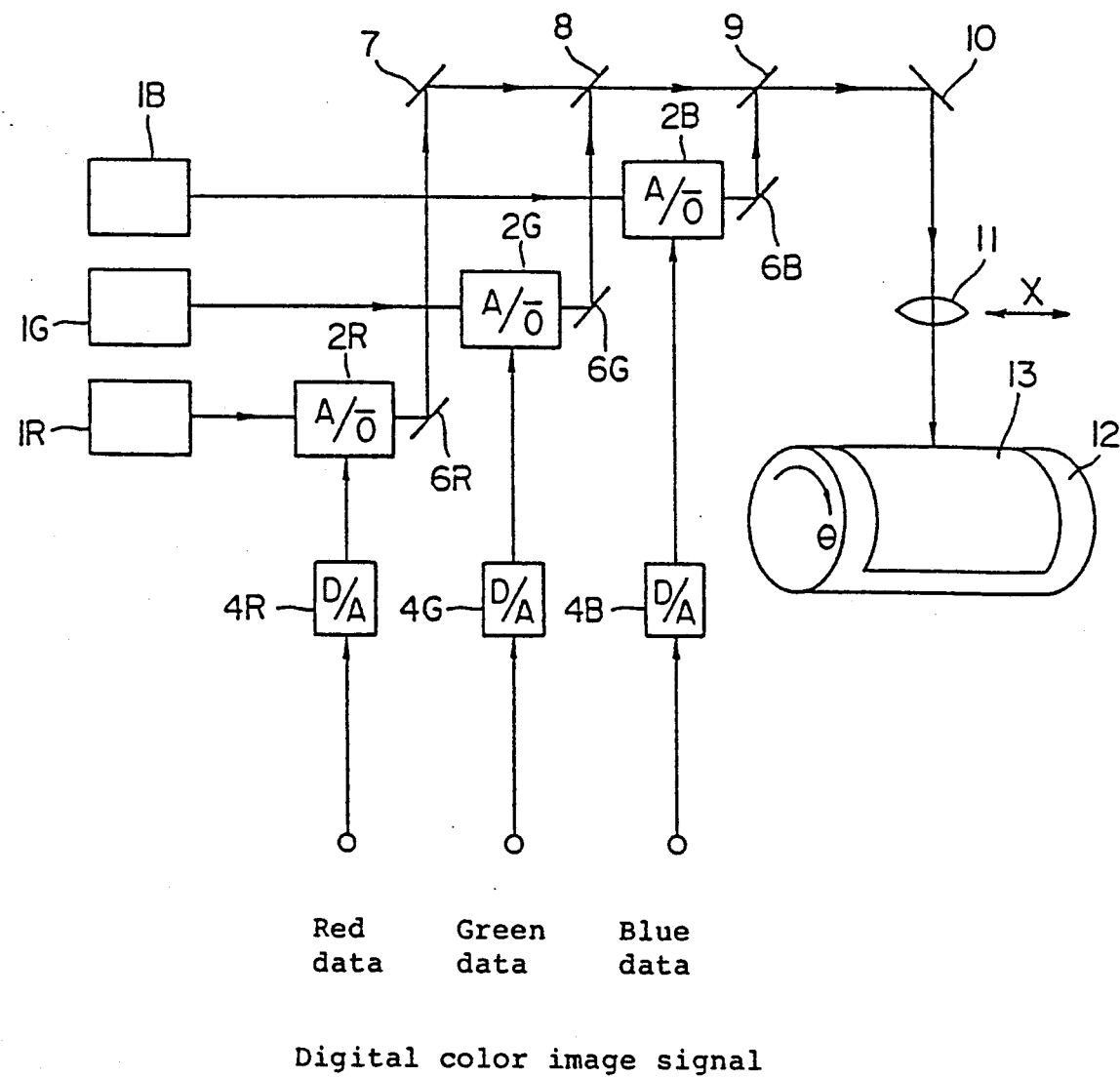
FIG. 1 is a block diagram of a color image forming apparatus of an example according to this invention.

FIG. 1 is a block diagram of a scanning exposure apparatus.

Light sources 1B, 1G and 1R are for use in the writing of blue data, green data and red data, respectively, for the images to be outputted.

The beams of light emitted from the light sources 1B, 1G and 1R are respectively subjected to beam strength modulation in optical modulators 2B, 2G and 2R according to the digital color image signals separated into three colors, i.e., blue data, green data and red data.

The above blue data, green data and red data are respectively D/A-converted in D/A convertors 4B, 4G and 4R and forwarded to the optical modulators 2B, 2G and 2R.

The light beams of the respective colors, modulated by the optical modulators 2B, 2G and 2R are made change in optical axes by the reflection by mirrors 6B, 6G and 6R, where the light beam reflected by the mirror 6R is adjusted in its optical axis to the side of a dichroic mirror 8 and synthesized with the reflected beam from the mirror 6G by means of a dichroic mirror 9. The light beam having been synthesized by these mirrors is adjusted in its optical axis by a mirror 10, further focused through a lens 11 and irradiated on a light-sensitive color material 13 rolled around a drum 12. The drum 12 is rotated in a constant speed in the direction of arrow $\theta$ (primary scanning) and concurrently moved to the direction of arrow X (secondary scanning), whereby image printing is effected on the light-sensitive color material 13.

Hereinafter, the present invention is mainly described about the embodiment accomplished by the combination of the He-Cd gas laser as the blue light source and the He-Ne gas laser as the green light source. However, as a matter of course, these description are also applied to the embodiment accomplished by the combination of the He-Ne gas laser as the green light source and at least one layer of the light-sensitive silver halide color photographic material containing silver chloride in an amount of 90 to 100 mole %.

In this invention, the blue light source is a He-Cd gas laser (441.6 nm) and a green light source is a He-Ne gas laser (543.5 nm). The light sources 1B, 1G and 1R may be, for example, any one of;

(1) the combination of three colors of blue light, green light and red light;

(2) the combination of three colors of blue light, green light and yellow light; and (3) the combination of three colors of blue light, green light and infrared light.

In these cases, any of the three colors may constitute 1B, 1G and 1R.

In view of the operation for the matching of optical axis, preferred is combination (1) comprising visible three colors.

Preferred as light sources other than for the blue light and yellow light are any of the combination of white light sources such as a glow lamp, a xenon lamp, a mercury lamp and a tungsten lamp with filters, the combination of light-emitting diodes, gas lasers, solid lasers, semiconductor lasers, particularly preferred is laser lights having narrow strength distribution of the outputted light.

Also, the combination of the respective lasers and wavelength converting elements may be used. Preferred is a combination of infrared semiconductor lasers and SHG elements in view of compactness.

Specific examples may include; as for yellow light, the combination of the SHG element with a He-Ne gas laser (594.1 nm, 611.9 nm), a light-emitting diode (the peak wavelength: 570 nm) or an infrared semiconductor laser, etc.; as for red light, a combination of the SHG element with a He-Ne gas laser (632.8 nm), a Kr+ gas laser (647.1 nm) and a semiconductor laser (678 nm), (750 nm), (780 nm), etc.; and, for infrared light, a combination of the SHG element with a semiconductor laser (810 nm), (830 nm), (850 nm), (1,030 nm), (1,300 nm) and a light-emitting diode (peak wavelength: 890 nm), (peak wavelength: 940 nm).

A plurality of oscillation may be obtained from one beam of the He-Ne gas laser, and used in a form divided by dichroic mirrors For example, two beams of oscillation lines (543.5 nm and 632.8 nm) may be obtained from one beam of the He-Ne gas laser.

In this invention, preferred is an embodiment in which a frame memory or memories corresponding to a sheet or several sheets of images are held in front of D/A converters 4B, 4G and 4R and the image signals are outputted after they are once stored in the frame memories. The input signals may comprise either digital image signals or analog image signals. In instances where the analog image signals are inputted, none of D/A converters 4B, 4G and 4R are required.

In instances where video signals are used as the analog signals, preferred are NTSC signals, BGR signals, HDTV (high vision) signals, PAL signals, SECAM signals, D2-MAC signals, HD-MAC signals, EDTV signals, IDTV signals and ACTV signals.

In this invention, light-source-stabilizing units such as light feedback units, light feed forward units or combined units thereof may optionally be added before beams are put in the optical modulators 2B, 2G and 2R.

Using optical fibers in place of flying light beams in space may preferably improve the maintenance, desirably. For examples, in FIG. 1, it is necessary to arrange the angle of mount and the spatial position of each devices so that each beam from the laser light sources 1B, 1G and 1R is accurately put in the light-receiving portion of the optical modulators 2B, 2G and 2R. For the optical axis adjustment and synthesis with use of mirrors, it is also necessary to set accurately the angle of mount and the spatial position. For this reason, respective elements of the optical system requires an optical axis adjustment mechanism which is good in accuracy, a base of rigid structure and a means for fixing to the base, resulting in high cost and large size of the apparatus. Further, in the adjustment of the optical axis adjustment mechanism, it requires much labour and time, because the adjustment of the direction of the optical axis and the spatial position of each element of the optical system are complicated, for example, a change of the optical axis at one position for change of specification or maintenance invites readjustment of the optical axis of other elements in the optical system.

Accordingly, the color image forming system having a unit constitution in which respective elements of optical system are connected by optical fibers is preferable, for the first purpose of giving a color image forming system by which adjustment of the optical axis and maintenance thereof can be made easily and arrangement of the optical system is desirably made to make compactness of the optical system feasible, and for the second purpose of providing a color image forming system by which image forming of high quality is made feasible.

Figure 3:
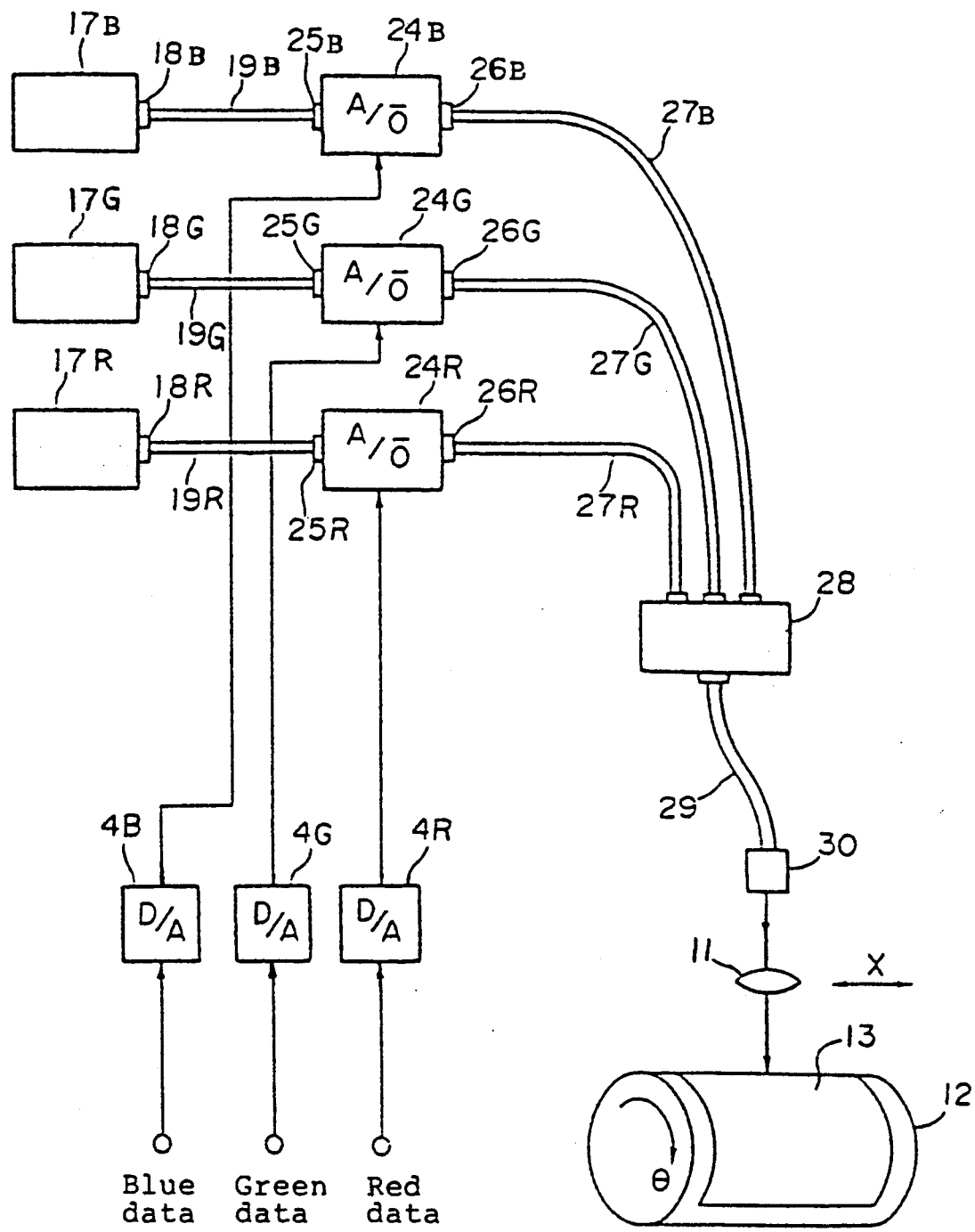

FIG. 3 is a view showing one example of the construction in which optical fibers are provided for the system of this invention. In this example, the optical fibers are applied to the apparatus for recording digital image data on a light-sensitive silver halide material rolled around the drum. In this figure, the same portions an in FIG. 1 are provided with the same numerals. In this figure, light source units 17B, 17G and 17R are each provided with optical fiber connectors 18B, 18G and 18R as a light output terminal Each terminal end of optical fibers 19B, 19G and 19R is connected to each of connectors 18B, 18G and 18R so as to take out the optical output. Optical modulating section units 24B, 24G and 24R are each provided with optical fiber connectors 25B, 25G and 25R as an optical input terminal. Each of the optical fibers 19B, 19G and 19R is connected to the connectors 18B, 18G and 18R respectively for receiving each optical input from the light source section units 17B, 17G and 17R. The optical modulating section units 24B, 24G and 24R are constituted so that they modulate the inputted light according to the modulating signals of each color given by the D/A convertors 4B, 4G and 4R, and then the optical outputs as a result of the modulating treatment are each taken out from the optical fiber connectors 26B, 26G and 26R. Respective optical outputs from the optical modulating section units 24B, 24G and 24R are each taken in an optical beam synthesizing unit 28 as an each input through optical fibers 27B, 27G and 27R. The optical output synthesized by the optical beam synthesizing unit 28 is introduced to an optical connector 30 through an optical fiber 29. The optical output from the optical connector 30 is introduced to a lens 11, and then focused through the lens 11 and irradiated on a light-sensitive color material rolled around the drum 12. The drum 12 is rotated in a constant speed in the direction of arrow θ (primary scanning) and concurrently moved to the direction of arrow X (secondary scanning), whereby image printing is effected on the light-sensitive color material.

Figure 4:
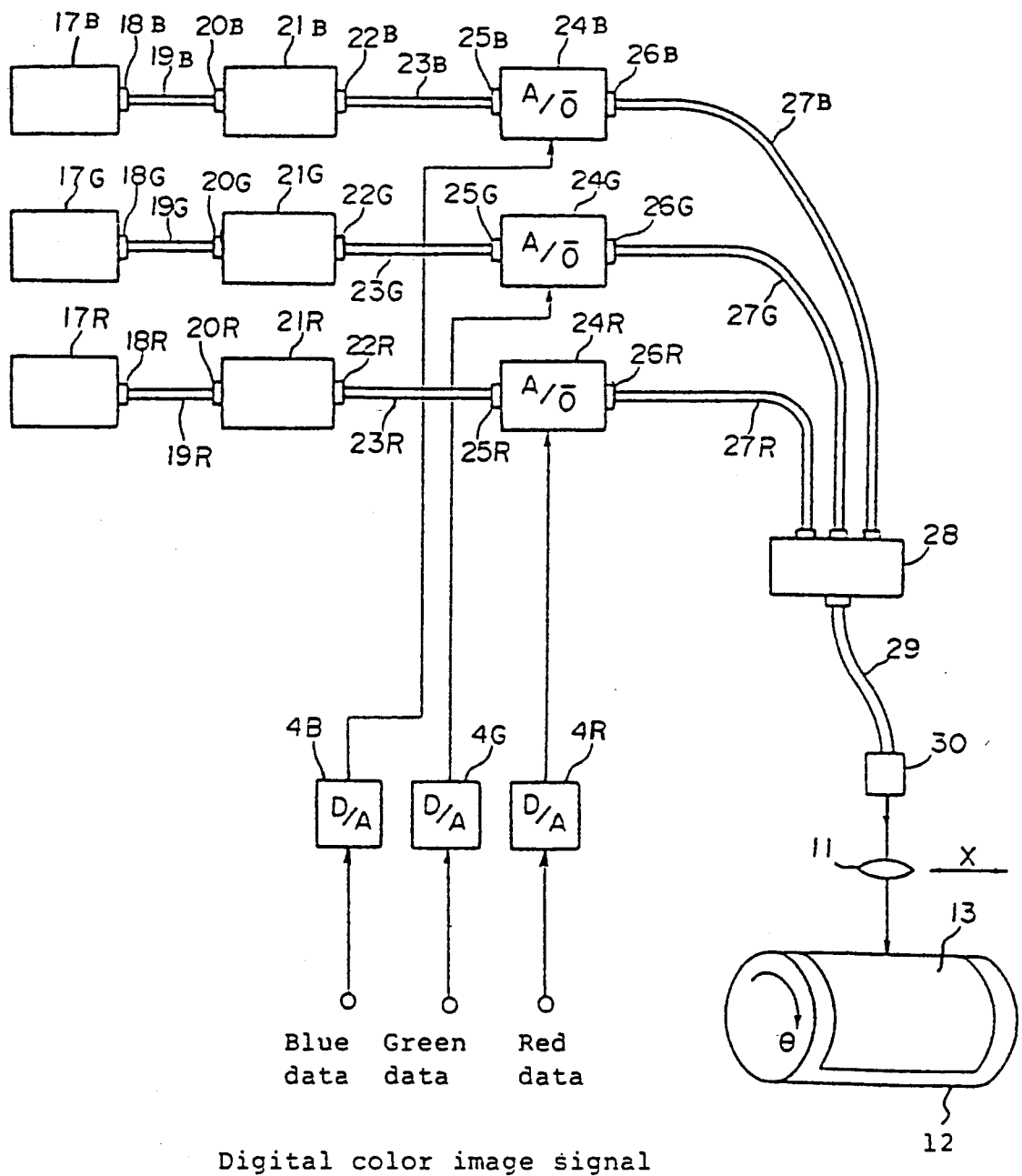

FIG. 4 shows other constitutional example in which optical fibers are used for the system of this invention The same positions as in FIG. 3 are denoted with the same numerals as in FIG. 3 for avoiding overlap of explanation.

Those being different from the structure shown in FIG. 3 are to provide light-source-stabilizing units 21B, 21G and 21R between the light source units 17B and 24B, 17G and 24G and 17R and 24R, respectively The light-source-stabilizing units 21B, 21G and 21R are each provided with optical fiber connectors 20B, 20G and 20R as a light input terminal and optical fiber connectors 22B, 22G and 22R as a light output terminal. The light-source-stabilizing units 21B, 21G and 21R are preferably provided, because it can make the output of high image quality feasible by the optical feed back, optical feed forward, etc.

Figure 5:
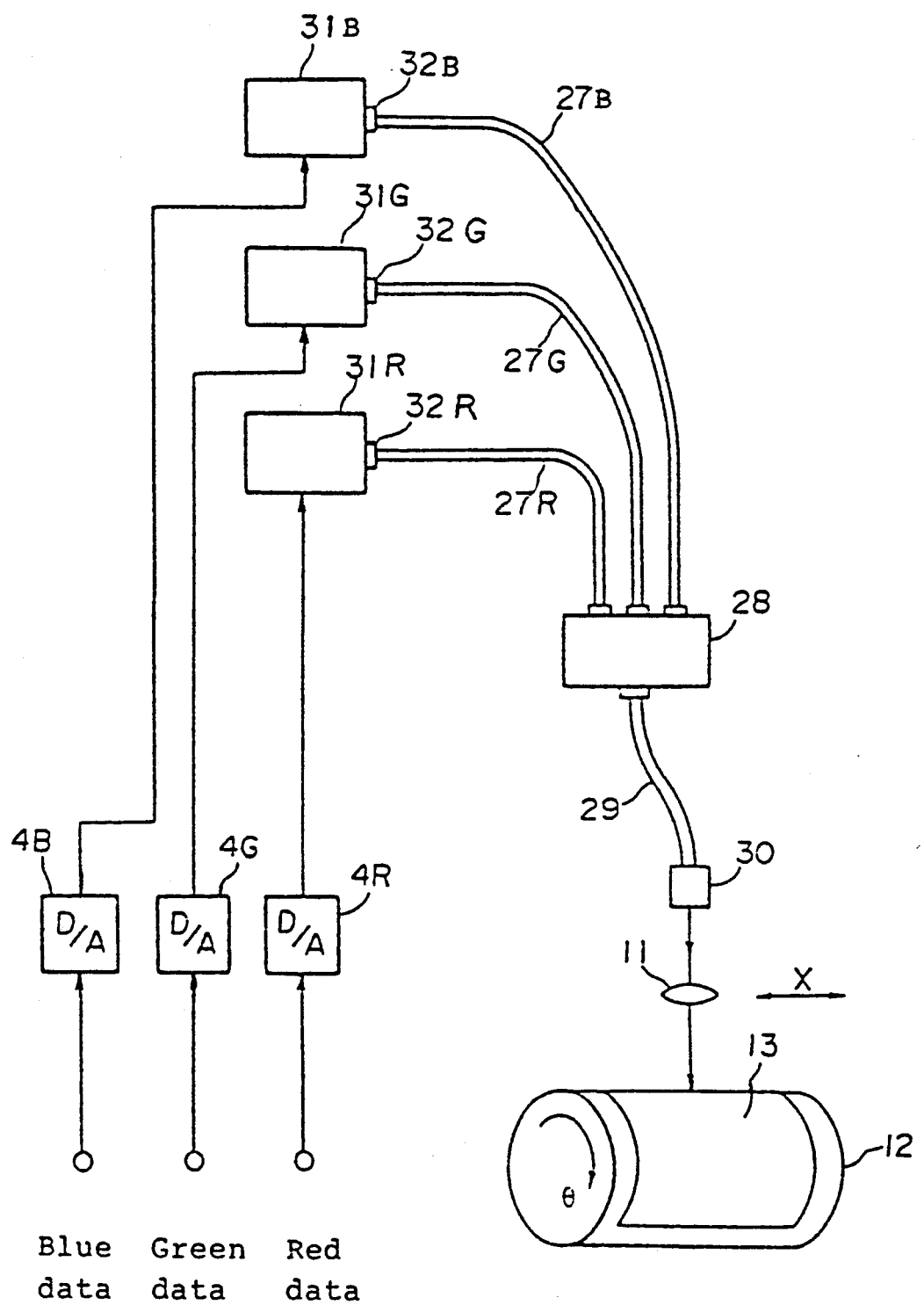

FIG. 5 shows other constitutional example in which optical fibers are used for the system of this invention. The same positions as in FIG. 4 are denoted with the same numerals as in FIG. 4 for avoiding overlap of explanation.

In this figure, units 31B, 31G and 31R are those in which the light source units 17B, 17G and 17R, the light-source-stabilizing units 21B, 21G and 21R and the optical modulating units 24B, 24G and 24R which are shown in FIG. 3 are arranged into one unit construction for each color. That is, units 31B, 31G and 31R each comprise the light source sections, the light-source-stabilizing sections and the optical modulating sections. Units 31B, 31G and 31R may of course be made in the unit construction comprising the light source sections and the optical modulating sections.

The respective parts may also more preferably be made into solids by use of optical waveguides, as thereby the number of the parts can be reduced and further mass production becomes possible to lower the cost.

The optical modulators each include electric optical modulators, acoustic optical modulators (AOM), waveguide type modulators (Japanese Unexamined Patent Publication No. 94823/1987) and loop type optical modulators (Japanese Unexamined Patent Publication No. 94821/1987).

Also in this invention, in instances in which the semiconductor lasers or light-emitting diodes are used as the light sources, the optical modulation may preferably be effected by direct current modulation without providing any optical modulators, as thereby the number of parts can be reduced.

The optical scanning in this invention may be made by the method of the combination mentioned below.

| Primary | Secondary |
|---|---|
| (a) Rotation of drum | Galvanometer |
| (b) Rotation of drum | Movement of drum |
| (c) Galvanometer | Galvanometer (Japanese Unexamined Patent Publication No. 4071/1980) |
| (d) Galvanometer | Conveyance of roll light-sensitive materials |
| (e) Polygon | Galvanometer |
| (f) Polygon | Conveyance of roll light-sensitive materials (Japanese Patent Publication No. 14963/1981) |

In place of the galvanometer, resonant scanners having the same functions may also be available. In the instance where the direct current modulation is effected by using semiconductor lasers or light-emitting diodes, the light sources themselves may be moved with movement of the objective lens in (b).

Semiconductor laser arrays or light-emitting diode arrays may also be used as light sources. In this instance, the scanning may comprise one, and the array may be scanned or the light-sensitive material may be scanned. The scanning of the light-sensitive material in this instance may comprise any of the rotation of the drum or conveyance of the roll light-sensitive material. In this invention, the scanning may be effected by moving of either light or a light-sensitive material, and it means relative movement of light to the light-sensitive material. Of these instances, in an instance where the image formation is carried out in a large quantity and high speed, preferred are (d) and (f) where the roll light-sensitive materials are used.

In the instance where a sheet light-sensitive material is used as the light-sensitive material, preferred are (a), (b), (c) and (e). More preferred to make the speed higher are (c) and (e), and particularly preferred is (e).

In place of the above galvanometer or polygon, also preferred is to use solid scanners as exemplified by an optical scanner which generates elastic surface waves in an optical waveguide (Japanese Unexamined Patent Publication No. 75622/1987) or an optical scanner comprising a laminated material with a contiguous layer in an optical waveguide, an energy-applying means, and a drive circuit (Japanese Unexamined Patent Publication No. 83727/1987), by which miniaturization of the apparatus can be made possible.

As the above scanning means, a linear motor may preferably be used as it can constitute the scanning exposure means which is inexpensive and does not require lumbersome handling such as minute adjustment and whereby scanning can be made with high accuracy. For example, in FIGS. 1 and 2, the lens 11 is moved by the linear motor in the direction of the arrow X (secondary scanning), by which image printing is carried out on the light-sensitive silver halide color material 13.

Figure 6:
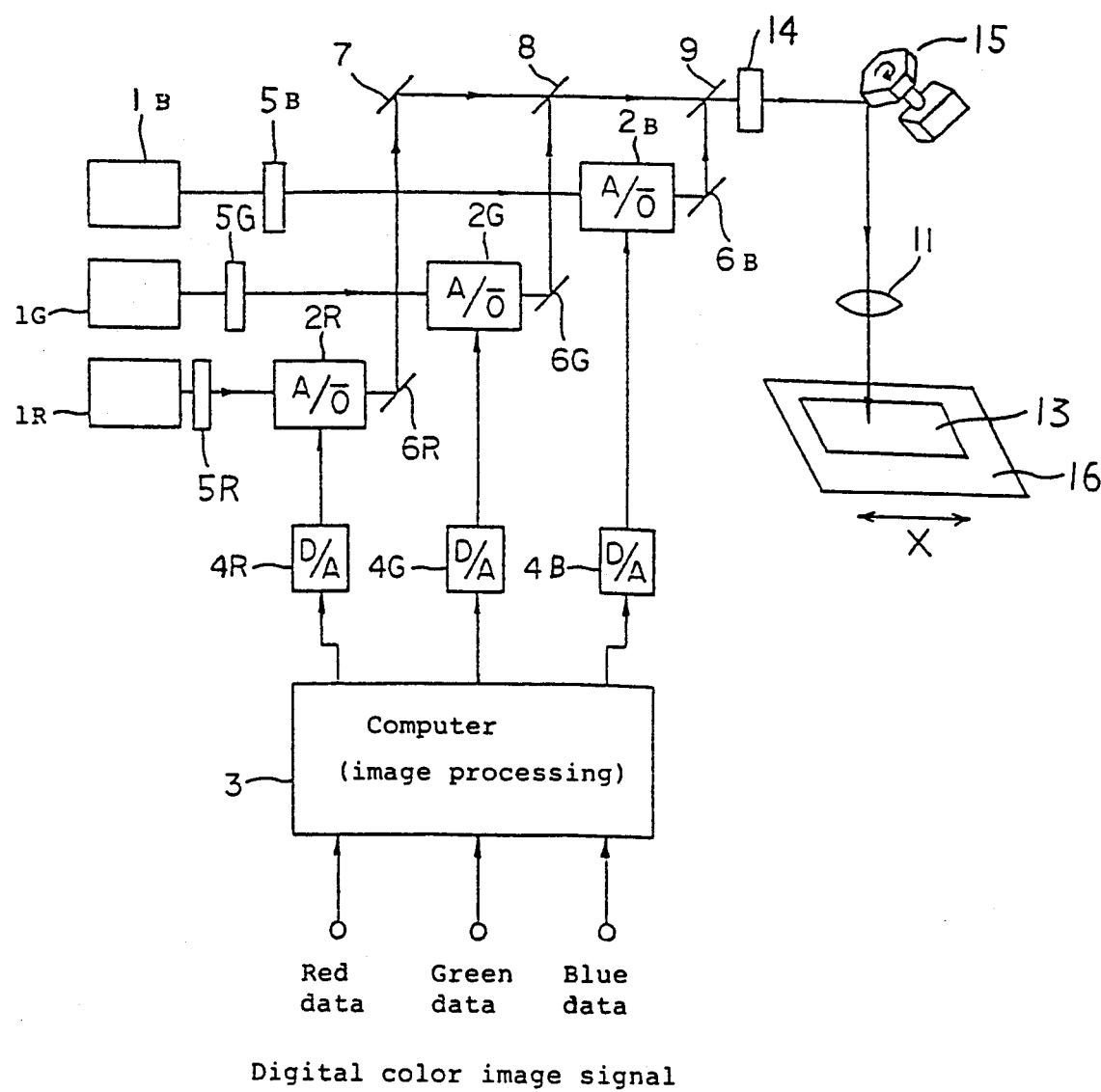

FIG. 6 is a block structural view showing other example of this invention. A beam of light formed by a light beam forming device 14 is reflected by a polygon 15, and is further irradiated through a lens 11 on the light-sensitive material 13 held on a light-sensitive material holding member 16. The polygon 15 is rotated in a constant speed (primary scanning) and concurrently the light-sensitive material holding member 16 is moved in the direction of the arrow X (secondary scanning) by the linear motor. Numerals 5B, 5G and 5R are the light-source-stabilizing devices.

In this invention, a beam of light may be formed by use of light beam forming devices such as the combination of a colimeter and an aperture, etc.

In this invention, the digital color image signals in FIG. 1 may be any signals as exemplified by those read from prints, originals of prints, and photographs (such as color prints, color negatives and color reversals).

In this invention, a computer 3 may preferably be inserted in front of the optical modulators 2B, 2G and 2R, as whereby various image processing can be carried out.

In this instance, the image data may be produced by the computer itself, as exemplified by computer graphics This computer may comprise a general purpose computer or a computer for exclusive use in image processing. The image processing operational functions possessed by the computer may include processing for removing noises in process image data for obtaining desired sharpness (such as Laplacean operation), tone conversion processing such as gradation conversion or color conversion, and affein conversion processing (such as enlargement, reduction, rotation, parallel movement, trimming, and mapping synthesis), as well as any special processing such as layout of two or more images, impartation of characters or signs, and also soft focusing. Particularly in instances in which the input image data are those read from a light-sensitive silver halide material, image quality can be preferably improved by the smoothing of graininess of silver halides, correction of gradation or the like processing. Particularly in instances in which an input light-sensitive silver halide material comprises a photographed light-sensitive material such as a photograph, image quality can be preferably improved by the amendment of under-exposure or over-exposure, out-of-focus, etc.

In instances in which an output light-sensitive material comprises a light-sensitive silver halide material, image quality can be preferably improved by the correction of gradation, correction to neutrality, etc.

In the case of color image forming system which comprises a rewritable recording means for recording a look up table (hereinafter sometimes abbreviated to LUT) for image data conversion and an interface for conducting connection with an outer signal for rewriting the look up table which has been recorded or stored in said recording means; or in the case of color image forming system in which exposure is conducted on a light-sensitive silver halide material with use of a scanning exposure apparatus which includes therein a rewritable recording means for recording a look up table for image data conversion and a computer connected to said recording means for rewriting the look up table recorded in the recording means, the following advantages can preferably be observed. In such cases, rewriting of LUT can be made easily and also speedily according to the properties of the inputted image, properties of the light-sensitive material on which the image is outputted, fluctuation of the light-sensitive material in the steps of processing. Also, whereby the system becomes small and inexpensive. Also, direct output from the medium such as magnetic tape can easily be made through off-line.

Figure 7:
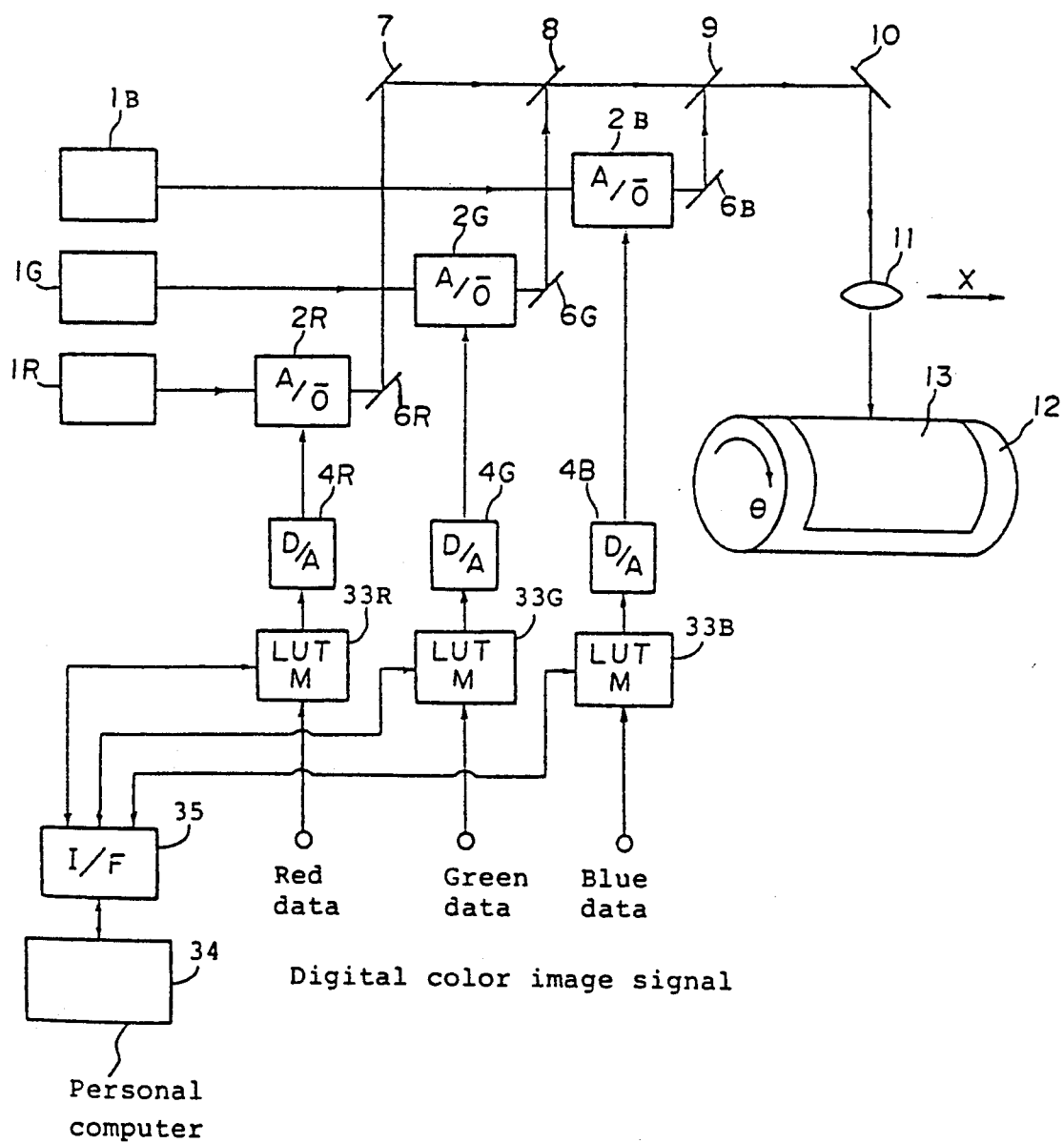

FIG. 7 is an example of this invention in which LUT is used. Blue data, green data and red data resolved in three colors by the optical modulators 2B, 2G and 2R (beam intensity modulation is conducted according to digital color image signal, blue data, green data and red data) are each subjected to data conversion in recording means 33B, 33G and 33R which record look up table (LUT) for image data conversion.

The blue data, green data and red data having been data converted are each D/A converted in the D/A convertors 4B, 4G and 4R and then be transferred to the optical modulators 2B, 2G and 2R.

The beams of light of each color having been modulated by the optical modulators 2B, 2G and 2R are changed in optical axis by the reflection by use of mirrors 6B, 6G and 6R, respectively, and the beam reflected by the mirror 6R is changed in optical axis to the side of the dichroic mirror 8 through the mirror 7, the synthesis of this beam with the beam reflected by the mirror 6G is effected by use of the dichroic mirror 8, and the synthesized beam is further synthesized with the reflected beam from the mirror 6B by using the dichroic mirror 9. The beam synthesized by these mirrors is changed in optical axis by the mirror 10, further focused through the lens 11, and irradiated on the light-sensitive material 13 rolled around the drum 12. The drum 12 is rotated in a constant speed in the direction of the arrow $\theta$ (primary scanning) and concurrently the lens 11 is moved in the direction of the arrow X (secondary scanning), whereby image printing is carried out on the light-sensitive color material 13.

To the recording means 33B, 33G and 33R in this invention, rewritable RAMs (random access memory) may be applied.

In the case where LUT of the recording means 33B, 33G and 33R is changed due to change of properties of the image inputted and of properties of the light-sensitive material to be outputted, or fluctuation in the step of processing of the light-sensitive material, such a change can readily be made with speed by use of a small personal computer 34 connected to the apparatus through an interface 35.

Figure 8:
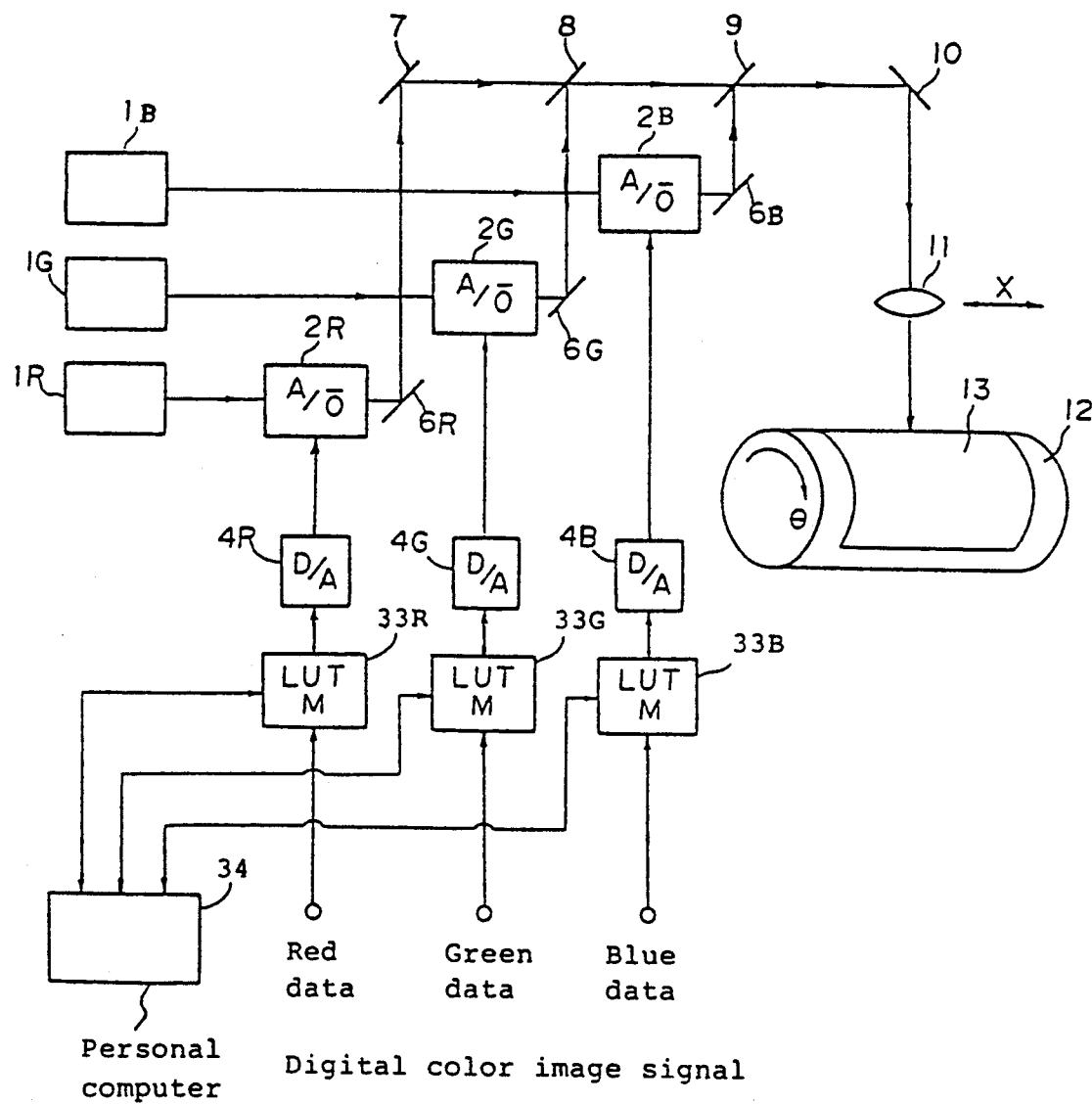

In FIG. 7, the system of this invention is constituted to have a structure where the personal computer 34 outside the system is connected thereto. However, as shown in FIG. 8, such a system may be taken that the personal computer 34 is provided in the system so as to be directly connected to the recording means 33B, 33G and 33R as a matter of course.

In place of the personal computer, those being small, inexpensive and easy in handling, for example, a micro computer and the like may be used.

Figure 9:
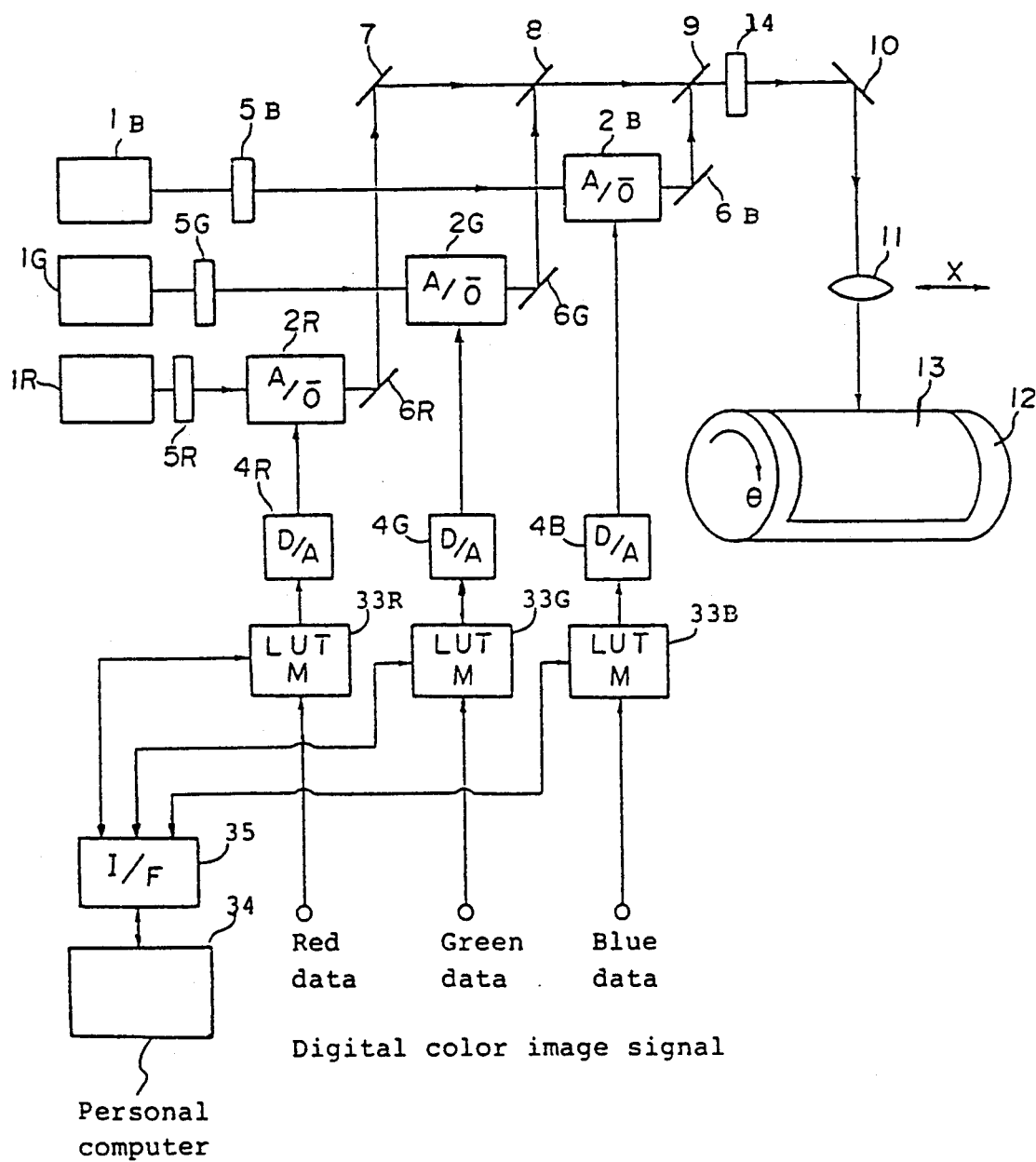
Figure 10:
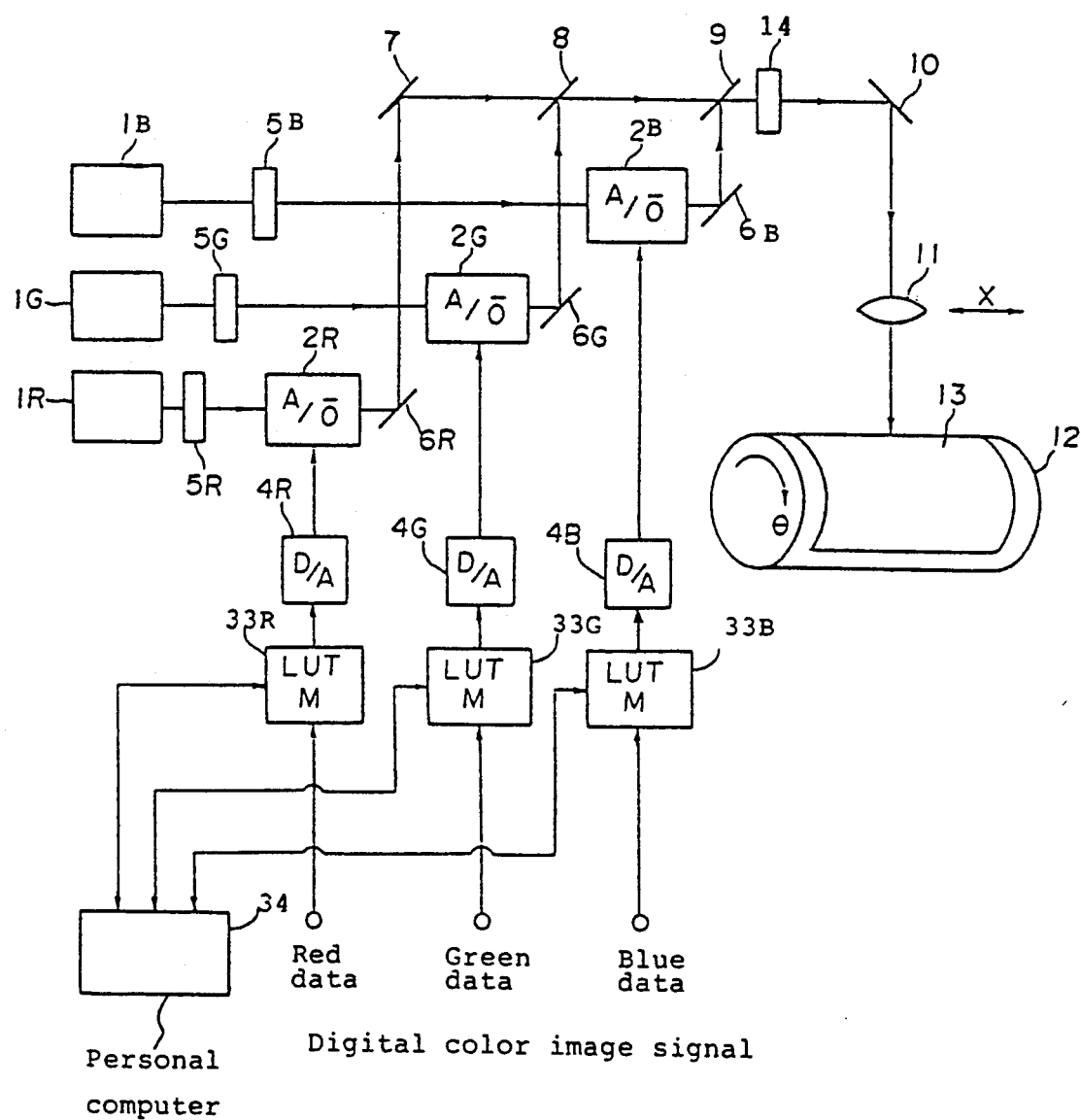

FIGS. 9 and 10 each show examples of this invention in which LUT is used and block structural views of apparatuses for recording digital image data on a light-sensitive silver halide color materials rolled around the drums. Beams of light emitted from the laser light sources 1B, 1G and 1R are put in the optical modulators 2B, 2G and 2R through the light-source-stabilizing devices 5Y, 5G and 5R, and then the beams are subjected to beam intensity modulation in the optical modulators 2B, 2G and 2R by applying modulation signals of each color from the D/A convertors 4B, 4G and 4R. Digital color image signals are subjected to data conversion in the recording means 33B, 33G and 33R which record LUT for image data conversion and then transferred to the D/A modulators 4B, 4G and 4R.

Beams of light of each color modulated by the optical modulators 2B, 2G and 2R are changed in optical axis by the reflection by use of the mirrors 6B, 6G and 6R, respectively, the beam of light reflected by the mirror 6R is changed in optical axis to the side of the dichroic mirror 8 through the mirror 7, the changed beam is synthesized with the reflected beam from the mirror 6G by use of the dichroic mirror 8, and the synthesized beam is further synthesized with the reflected beam from the mirror 6B by use of the dichroic mirror 9. The beam of light synthesized by these mirrors are formed in beam by use of an optical beam forming device 14 which is composed of, for example, the combination of an aperture and a colimeter, changed in optical axis by the mirror 10, and further focused through the lens 11, and irradiated on the light-sensitive silver halide material 13 rolloed around the drum 12. The drum 12 is rotated in a constant speed in the direction of the arrow $\theta$ (primary scanning) and concurrently the lens 11 is moved in the direction of the arrow X (secondary scanning), whereby image printing is carried out on the light-sensitive silver halide color material 13.

In this invention, a supplier and a receiver may preferably be provided for the output light-sensitive material, as thereby the light-sensitive material can be made easy to handle. For example, in the case of the sheet light-sensitive material, preferred are a drum in a portable dark box, or casette suppliers or casette receivers comprising a dark box capable of containing several ten sheets; and in the case of the roll light-sensitive material, casette suppliers or casette receivers comprising a dark box.

In this invention, the light-sensitive silver halide photographic material may be any of silver halide color negative papers, silver halide color positive papers, silver halide color negative films, silver halide color positive films and so forth if they have spectral sensitivities corresponding to the spectral distribution of light intensity of light sources. Preferred is a light-sensitive material having a reflective support. These light-sensitive silver halide color photographic materials may be any of wet processing type and dry processing type, without any limitation.

As an emulsion to be used for the light-sensitive material, particularly preferred is a substantially silver chloride emulsion which causes less color turbidity and by which high image quality and rapid development processing are feasible. The substantially silver chloride emulsion in this invention is referred to the emulsion containing small amount of silver bromide in such amount that their effects mentioned above are comparable with those of pure silver chloride emulsion. Specifically, they may include the emulsions of which the content of silver chloride is 90 to 100 mole %, preferably 95 to 100 mole %. The light-sensitive color photographic material using it can be obtained in accordance with the methods described in Japanese Unexamined Patent Publication Nos. 264741/1988, 146033/1988, 188129/1988 and 41848/1988.

In this invention, in instances where the apparatus is an apparatus to make output to a light-sensitive color photographic material, the apparatus may preferably have a color development processing unit. Needless to say, this processing unit should be a unit suited for the light-sensitive material to be used.

In this invention, as methods of inputting the digital color image signals shown in FIG. 1, they may be inputted from output signals from a computer, or from a medium such as a magnetic tape, a magnetic disc, a laser disc or a photomagnetic disc.

In this invention, the apparatus may have an image reader at the signal input section. The image reader may be any of scanners which read original images by optical scanning, or those which read them by means of a CCD array or a two-dimensional CCD, but preferred are those using the CCD in view of the compactness and high speed performance.

In this invention, there is no limitation in the writing speed, the size (aperture) of the image to be written and the size of output image.

Preferred embodiments of this invention include a variety of embodiments.

For example, preferred embodiments include a color copying machine having the image reader and the color development processing unit, and capable of reading various original images and making output to light-sensitive silver halide color photographic materials; a color printer having the image reader and the color development processing unit, and capable of reading silver halide negative films or positive films and making output to silver halide color negative paper or positive paper; a reproduction (extra-printing) unit having the image reader and the color development processing unit, and capable of making reading and making output to the light-sensitive materials same as light-sensitive silver halide color materials; and a color proof system (tone-detecting system) having the image reader and the color development processing unit, and capable of reading originals for prints or separation plates for prints and making output to light-sensitive silver halide color materials.

Other embodiments preferred as general purpose output apparatus that can obtain an image by making connection with other signal output units through signal input terminals, include, for example, a hard-copying apparatus for a computer that receives as input signals the output signals from a computer, a color printer that receives as input signals the output signals from an image reader, a color printer that directly receives input signals from mediums such as magnetic tapes, magnetic discs, laser discs and photomagnetic discs, and a video printer that receives as input signals the video signals.

These apparatus should preferably have the color development processing unit.

(EXAMPLES)

Figure 2:
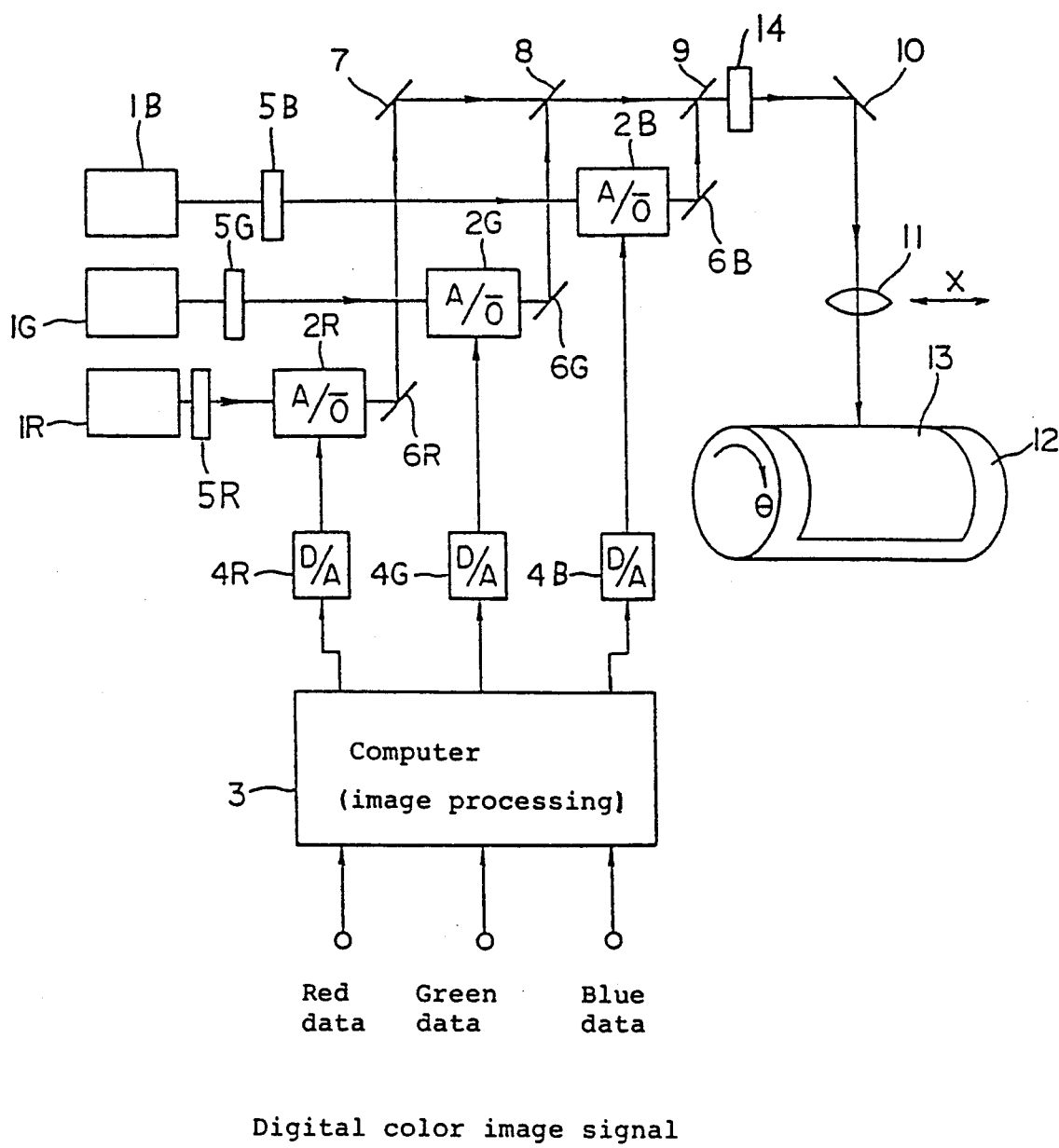
FIGS. 2 to 10 are block diagrams showing other examples of this invention.

FIG. 2 is a block diagram illustrating an example of this invention. It is an apparatus for recording digital image data from a computer on a light-sensitive silver halide color photographic material mounted on a drum. The symbol 1B denotes a He-Cd gas laser (441.6 nm, blue light); 1G, a He-Ne gas laser (543.5 nm, green light); and 1R, a He-Ne gas laser (632.8 nm, red light).

Light beams emitted from laser light sources 1B, 1G and 1R are put in optical modulators 2B, 2G and 2R through light-source-stabilizing devices 5B, 5G and 5R.

In these optical modulators 2B, 2G and 2R, the modulated signals for each color from a computer 3 are applied from D/A converters 4B, 4G and 4R to effect the beam strength modulation. The computer 3 performs image processing such as gradation processing and outline emphasis processing, of the digital color image signals and outputs them as modulated signals.

The light beams of the respective colors, modulated by the optical modulators 2B, 2G and 2R are made change in optical axes by the reflection by mirrors 6B, 6G and 6R, where the light beam reflected by the mirror 6R is adjusted in its optical axis to the side of a dichroic mirror 8 and synthesized with the reflected beam from the mirror 6G by means of a dichroic mirror 9. The light beam having been synthesized by these mirrors is formed in beam by an optical beam forming device 14 comprising, for example, the combination of an aperture and a colimeter, adjusted in its optical axis by a mirror 10, further focused through a lens 11 and irradiated on a light-sensitive silver halide color photographic material 13 rolled around a drum 12. The drum 12 is rotated in a constant speed in the direction of arrow $\theta$ (primary scanning) and concurrently moved to the direction of arrow X (secondary scanning), whereby image printing is effected on the light-sensitive silver halide color photographic material 13.

Next, a comparison was made by using the apparatus used in this example and the conventional apparatus as described below, and effecting blue-light exposure and green-light exposure on Konica Color PC Paper Type SR produced by Konica Corporation, followed by appropriate color development processing respectively. The conventional apparatus mentioned above was the apparatus shown in FIG. 2, except that the blue light source 1B is replaced with Ar$^+$ gas laser (488.0 nm) and the green light source 1G is replaced with Ar$^+$ gas laser (514.5 nm). The proportion of yellow to magenta (M/Y) of the sample having been subjected to blue light exposure and the proportion of magenta to yellow (M/Y) of the sample having been subjected to green light exposure are shown in Table 1 in terms of percentage. From the results of Table 1, it is observed that the apparatus according to this invention can produce the images being less in color turbidity as compared with the conventional apparatus.

TABLE 1

|  | Blue-light exposure M/Y (%) | Green-light exposure Y/M (%) |
| --- | --- | --- |
| Exposure was made by use of the conventional apparatus | 17.2 | 10.4 |
| Exposure was made by use of the apparatus of this example | 11.2 | 0.2 |

Further, prepared was a color paper (Sample A) containing the substantially silver chloride emulsion of which the content of silver chloride was 99.5 mole % in accordance with the method described in Japanese Unexamined Patent Publication No. 264741/1988. The same test as described above was carried out on Sample A by use of the apparatus of this example. The results are shown in Table 2. From the results, it is observed that employment of a color paper having the substantially silver chloride emulsion can achieve particularly less color turbidity.

TABLE 2

|  | Blue-light exposure M/Y (%) | Green-light exposure Y/M (%) |
| --- | --- | --- |
| Exposure of Sample A was made by use of the apparatus of this example | 3.8 | 0.1 |

The color image obtained by using a silver halide color negative paper (Konica Color PC Paper produced by Konica Corporation) and carrying out appropriate image development processing with the apparatus shown in Example 1, was good in color reproduction and free from any noise showing unstableness of the light sources and showed a high image quality.

Moreover, the similar tests were conducted by using Sample A, color images of high image quality with good color reproducibility was obtained with short period of development treatment time.

Next, the above tests were repeated by using a conventional paper and Sample A with use of the above apparatus, except for replacing He-Cd gas laser (441.6 nm) as a blue-light source 1B with Ar$^+$ gas laser (488.0 nm). The results are shown in Table 3.

TABLE 3

| Apparatus | Light-sensitive material | Blue-light exposure M/Y (%) | Green-light exposure Y/M (%) |
| --- | --- | --- | --- |
| Blue light: Ar$^+$ Green light: He—Ne | Conventional paper (*) | 17.2 | 0.2 |
| Blue light: Ar$^+$ Green light: He—Ne | Sample A | 11.5 | 0.1 |

*: Silver halide color negative paper (Konica Color PC Paper produced by Konica Corporation)

As will be understood from the above table, the combination of employment of He-Ne gas laser as a green-light source and the light-sensitive material containing the substantially silver chloride emulsion can attain less color turbidity.

In other words, the color image forming system of this invention has a scanning exposure apparatus using inexpensive, stable, compact and long-life light sources, and can obtain a color image of high image quality with good color reproducibility on the light-sensitive silver halide photographic material. Also, the system can be made inexpensive and compact as a whole.

We claim:

1. A color image forming system comprising the combination of:
    a multi-layer light-sensitive color photographic material having at least one layer of light-sensitive silver halide color photographic material containing silver chloride in an amount of 90 to 100 mole %; and
    an optical scanning exposure apparatus for scanning said multi-layer light-sensitive silver halide color photographic material;
    said optical scanning exposure apparatus including:
    an He-Cd gas laser generating blue light and used as a blue light source for said scanning; and
    an He-Ne gas laser generating green light and used as a green light source for said scanning.

2. The color image forming system according to claim 1, wherein said optical scanning exposure apparatus further comprises an He-Ne gas laser generating red light and used as a red light source for said scanning.

3. The color image forming system according to claim 1, wherein said optical exposure scanning apparatus further comprises a unit structure having an optical system connected by optical fibers.

4. The color image forming system according to claim 3, wherein said unit structure comprises a plurality of light source units which emit beams of light of plural colors, optical modulating units for modulating the beams of light and beam synthesizing units.

5. The color image forming system according to claim 3, wherein said unit structure comprises a plurality of light source units which emit beams of light of plural colors, light-source-stabilizing units, optical modulating units for modulating the beams of light and optical beam synthesizing units.

6. The color image forming system according to claim 3, wherein said unit structure comprises:
   a unit including a light source section, a light-source-stabilizing section and an optical modulating section; and
   an optical beam synthesizing unit for producing optical beams of blue color, green color and red color, respectively.

7. The color image forming system according to claim 1, further comprising:
   a rewritable recording means for recording a look up table for image data conversion; and
   an interface means for conducting connection with an outside signal for rewriting the look up table recorded in said rewritable recording means.

8. The color image forming system according to claim 7, wherein said outside signal is a signal inputted from a computer.

9. The color image forming system according to claim 1, further comprising:
   a rewritable recording means for recording a look up table for image data conversion; and
   a computer means connected to said recording mans for rewriting the look up table recorded in said recording means.

10. The color image forming system according to claim 1, wherein said optical scanning exposure apparatus comprises a linear motor for effecting said scanning.

11. The color image forming system according to claim 10, wherein said optical scanning exposure apparatus comprises:
    a rotatable drum on which said light-sensitive silver halide color photographic material is rolled around, primary scanning being carried out during movement of aid drum; and
    a linear motor coupled to at least one of said drum and an optical system, secondary scanning being carried out by movement of at least one of said drum and said optical system by said linear motor.

12. The color image forming system according to claim 10, wherein said optical scanning exposure apparatus comprises:
    a polygon or a galvanometer for carrying out a primary scanning; and
    for moving one of the light-sensitive silver halide color photographic material an optical system to carry out secondary scanning.

13. The color image forming system according to claim 1, wherein the light-sensitive silver halide color photographic material has a reflective support.

* * * * *